Dec. 17, 1940.  P. FRANKE  2,225,106
POPCORN CUTTER
Filed Jan. 19, 1939  3 Sheets-Sheet 1
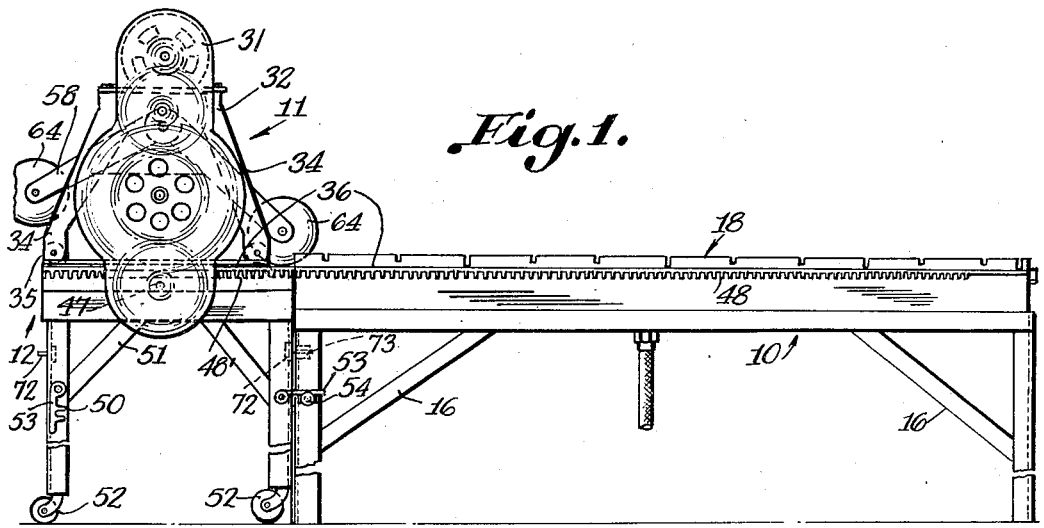
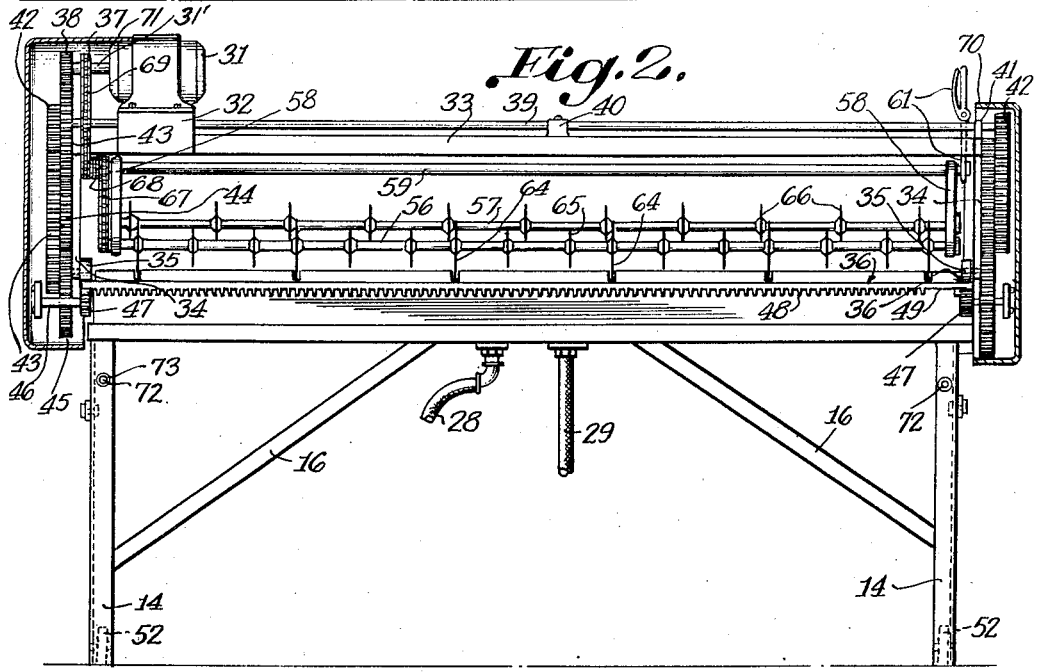
INVENTOR.
PETER FRANKE.
BY Miller & Miller
ATTORNEYS.

Dec. 17, 1940.　　　P. FRANKE　　　2,225,106
POPCORN CUTTER
Filed Jan. 19, 1939　　　3 Sheets-Sheet 2
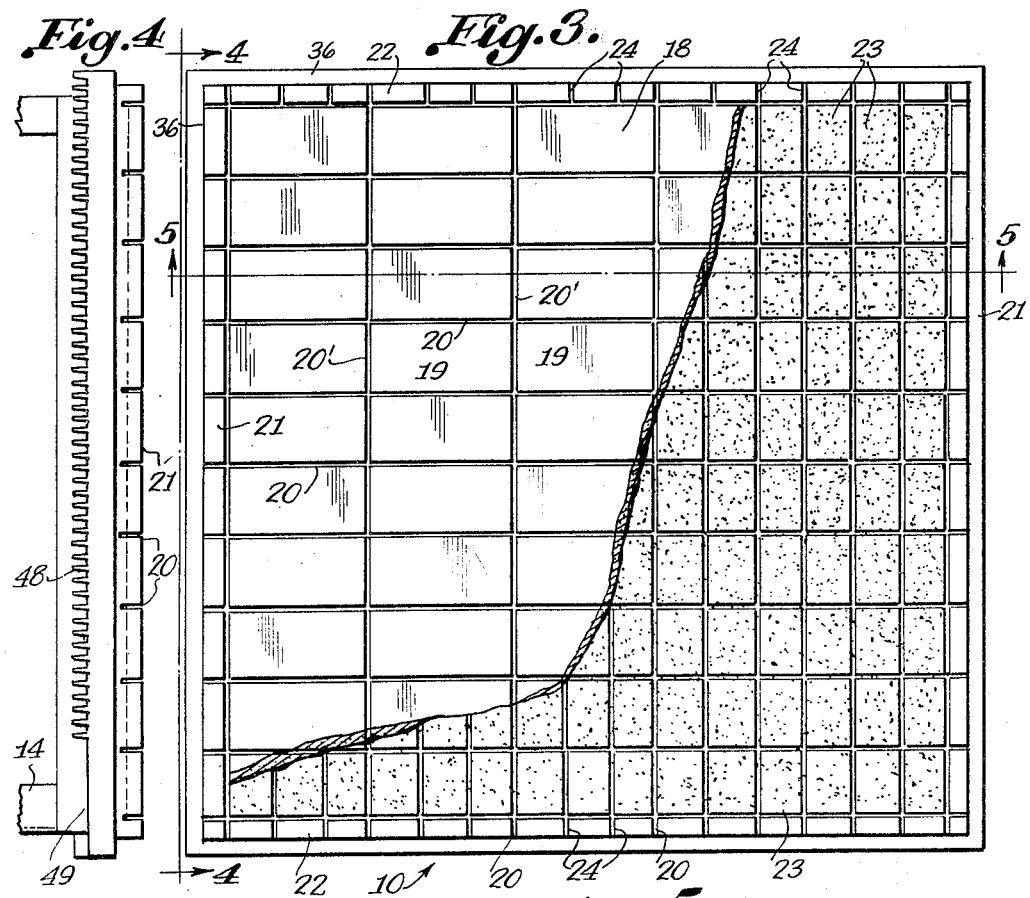
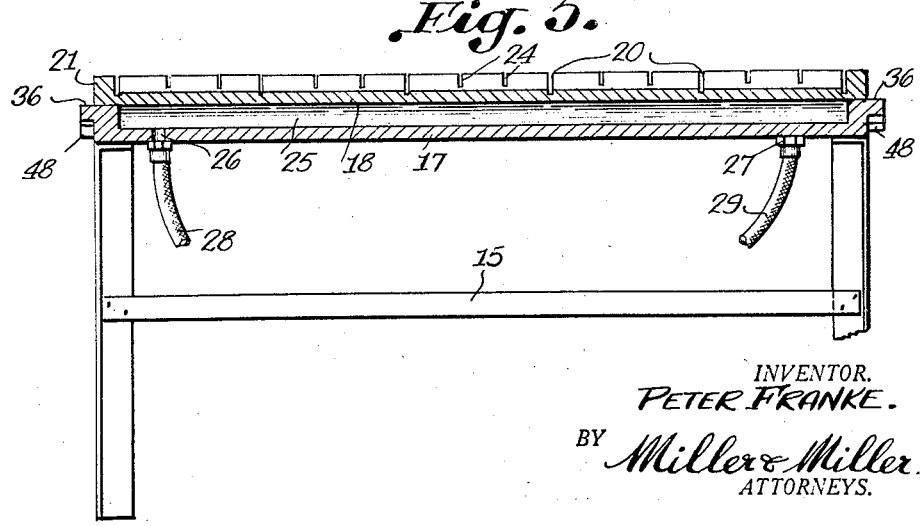
INVENTOR.
PETER FRANKE.
BY Miller & Miller
ATTORNEYS.

Dec. 17, 1940.  P. FRANKE  2,225,106
POPCORN CUTTER
Filed Jan. 19, 1939   3 Sheets-Sheet 3
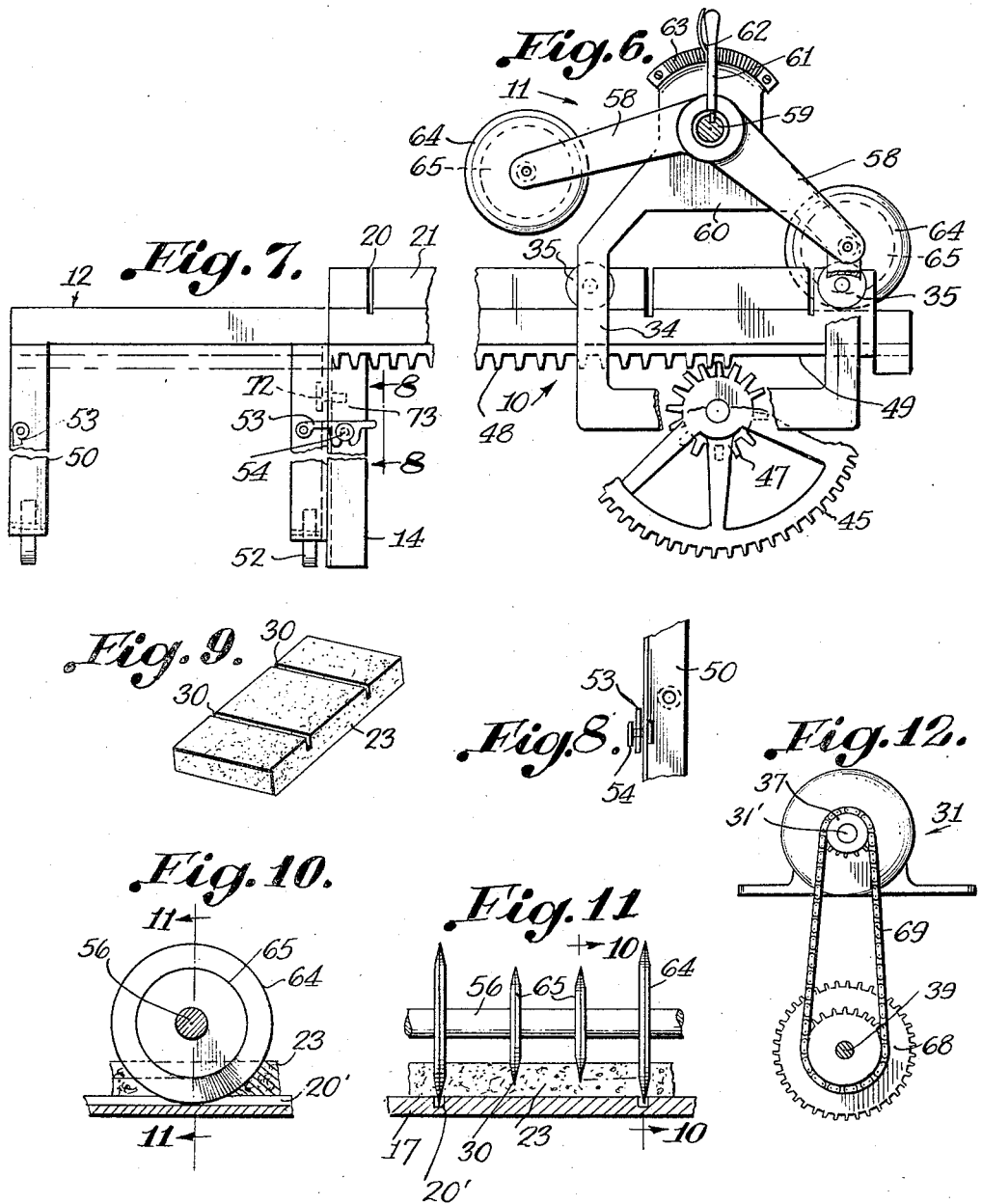
INVENTOR.
PETER FRANKE.
BY Miller & Miller
ATTORNEYS.

Patented Dec. 17, 1940

2,225,106

UNITED STATES PATENT OFFICE 2,225,106

POPCORN CUTTER

Peter Franke, West Haven, Conn.

Application January 19, 1939, Serial No. 251,852

8 Claims. (Cl. 107—22)

This invention relates to a popcorn cutter and has for an object to provide an improved means for cutting popcorn into blocks, or more accurately, into rectangles ready for either wrapping or for use without wrapping.

A further object of this invention is to provide an improved means for subdividing the blocks of popcorn so that they may readily be separated into smaller portions by the consumer thereof.

A still further object of this invention is to provide a table wherein the above objects may be carried out either manually with hand knives or with machine operated cutters.

A further object of this invention is to provide a cutter table surface made of a material to which the hot popcorn will not stick after the cutting operation is completed, and which may be cooled artificially to enable the operations to be carried on with greater rapidity.

Yet a further object of this invention is to provide a machine operated cutter device and cooperative means secured adjacent the table surface for cutting the popcorn with great rapidity and ease of operation.

A further object of this invention is to provide a power operated machine cutter which is power actuated to travel over the table and in addition, has power actuated cutting knives to do the cutting as the cutter travels over the table.

With the foregoing and other objects in view, as will hereinafter become apparent, this invention comprises the combinations, construction and arrangement of parts or their equivalents illustrated on the accompanying drawings and hereinafter disclosed and claimed. In the drawings:

Fig. 1 is a side view of the cutter machine, the machine table, and the popcorn cutter table.

Fig. 2 is a front view of Fig. 1.

Fig. 3 is a top plan view of the popcorn cutter table, with a layer of popcorn thereon partly broken away.

Fig. 4 is an end fragment on line 4—4 of Fig. 3.

Fig. 5 is a sectional view on line 5—5 of Fig. 3.

Fig. 6 is a fragmentary detail of the cutter positioner.

Fig. 7 is a fragmentary detail of the means for securely latching the tables together.

Fig. 8 is a detail on line 8—8 of Fig. 7.

Fig. 9 is a perspective view of a finished popcorn block.

Fig. 10 is view of a cutter, on line 10—10 of Fig. 11.

Fig. 11 is view on line 11—11 of Fig. 10, and

Fig. 12 shows a chain connection between the motor and the cutter.

This invention includes three principal items, a popcorn table 10, a popcorn cutting machine 11, and a popcorn cutting machine table 12.

The popcorn table 10 is supported on legs 14, together with cross braces 15 and angle braces 16, on which rests the table bottom 17. The table 10 includes a table surface 18, which is divided into a plurality of rectangles 19 by grooves 20 and 20' extending at right angles to each other, and extending through upstanding borders 21 and 22 about the four sides of the table surface 18. The borders 21 and 22 extend above the table surface 18 a distance equal to the desired thickness of the popcorn blocks 23, which are to be formed thereon. The two borders 22 are provided with two additional grooves 24 between each of the grooves 20', but of a depth so that they do not reach to the table surface 18, while the grooves 20', as before pointed out, extend into the table surface 18.

The table surface 18 is preferably made of cast aluminum, for the popcorn is spread thereover while it is hot, and it has been found that this material alone enables the completed popcorn blocks 23 to be easily removed therefrom after the cutting is completed, without the popcorn sticking to the table surface and ruining the completed popcorn blocks.

The table bottom 17 may preferably be made of the same material for convenience, but not necessarily so. The table bottom 17 is provided with a shallow recess 25 extending completely under the table surface 18 between the borders 21 and 22. Two ports 26 and 27 are provided, leading through the table bottom 17, and a water supply and water drainage pipes 28 and 29 are connected to these ports, whereby a continuous circulation of cooling water or other medium may be provided against the lower side of the table surface 18, thus cooling the popcorn layer thereon more rapidly.

In operation, this item of invention, as thus far described, may be used entirely separately for manual operation for manually cutting popcorn into rectangles 23. The hot popcorn, in semiplastic condition, is spread over the table surface 18 between the borders 21 and 22 to a depth equal to the height of the borders 21 and 22, being smoothed down, if necessary, by means of a large trowel or stick passed over the borders.

A knife, manually operated, may then be run down the grooves 20 and 20' in both directions, dividing the layer of popcorn into rectangles or blocks, which may then be removed therefrom and packaged for sale.

As thus used, no use is made of the grooves 24 in the borders 22, these grooves 24 cooperating with the machine cutter 11 for providing breakage grooves 30 in the popcorn blocks 23, permitting the consumer to more readily separate the popcorn into smaller portions in eating.

The popcorn machine cutter 11 includes an electric motor 31 supported on a base 32 mounted on a cross-bar 33 having depending legs 34 provided with rollers 35 adapted to travel over a trackway 36 provided by the table bottom 17 extending slightly beyond the edges of the table surface borders 21 and 22.

For convenience, the motor base 32 may be located adjacent one side of the cross-bar 33, whereby only a short motor shaft 31' is necessary. This shaft 31' is provided with a sprocket wheel 37 and a pinion 38. A long shaft 39, journaled through the base 32, a center bearing 40 on cross-bar 33, and a bearing 41 at the other end thereof, is provided with a small pinion 42 at each end thereof. A large gear 43 is keyed on the shaft 39 and meshes with the motor pinion 38 for receiving power from the motor 31. The power is then transmitted to the shaft pinion 42, and a gear train, including a large gear 43, to which is keyed a small pinion 44, in turn meshes with a large gear 45, keyed on a shaft 46, which carries a gear wheel 47 extending under the trackways 36.

A gear track 48 is provided under each trackway 36 and has teeth to cooperate with the gear wheels 47. The gear train, including from the gears 42 to the gear wheel 47, is duplicated at the opposite end of the cross-bar 33, and is actuated simultaneously by the shaft 39.

The motor 31 is a reversible motor, provided with suitable control switches for actuating it in either direction, and it is obvious that rotation of the motor will cause rotation of the gear wheel 47, and cause the whole cutter machine 11 to travel over the popcorn table 10, being supported thereon by rollers 35 and actuated by gear wheels 47 and gear tracks 48.

The exit end of each gear track 48 has a plurality of teeth omitted, leaving the blank section 49, so that when the cutter machine 11 reaches the end of the table, it will not be able to travel any further to thus fall off the table and crash.

The popcorn table 10 is square, while the machine cutter table 12 has the same width as the popcorn table 10, but is substantially narrower. This popcorn table 12 is provided with trackways 36' and gear tracks 48' along the short sides thereof. Legs 50 and braces 51 support the machine table 12, the legs 50, in turn, being provided with caster wheels 52, the height of the machine table 12 being identical with the height of the popcorn table 10.

Latch hooks 53 are pivoted on each of the legs of the machine table 12, and latch keepers 54 are provided on corresponding sides of two of the legs of the popcorn table 10, and, in addition, are provided on another side of one of these legs, and on the adjacent leg of the table 10. By means of these latches, and of pins 72 on legs 50 and cooperative apertures 73 in legs 14, the machine table 12 may be brought into cooperative relation with one side, or the adjacent side of the popcorn table 10, whereby the tracks 36 and 36' and gear tracks 48 and 48' form a continuation of each other, enabling the machine cutter 11 to travel onto and off of the popcorn table 10 from either of two adjacent sides.

The machine cutter 11 is provided with two cutter carrying shafts 56 and 57. Each of these shafts is journaled at its ends in yoke arms 58, and the yoke arms 58, in turn, are fixed on the ends of a supporting shaft 59, the shaft 59 being journaled at its ends in face plates 60, which secure the legs 34 to the cross-bar 33.

A hand lever 61 having a pawl 62 cooperating with a ratchet arc 63 serves to shift the position of the yoke arms 58, and thus of the cutter shafts 56 and 57, and hold it in desired position, for, in operation of the knives, only one of the cutter shafts will do cutting actuations at one time.

The shaft 56 is provided with a plurality of large cutter discs 64 spaced a distance equal to the distance of the grooves 20', which extend through the borders 22. Between each cutter disc 64 there is provided a pair of small cutter discs spaced apart a distance equal to the distance between the grooves 24 in the border 22.

The diameters of the discs 64 and 65 are such that when cutter shaft 56 is in operative position, the discs 64 extend into the table surface 18, while the small disc 65 stops short of the table surface and extends only to the bottom of the grooves 24, the small discs 65 making the breakage cuts 30 in the popcorn blocks 23, while the large discs 64 cut the ends of the blocks 23 parallel to the breakage cuts 30.

The other cutter shaft 57 is provided with a plurality of large diameter discs 66 equal to the discs 64, and, in operation, extend to the bottom of the grooves 20 which extend through the borders 21.

One end of each of the shafts 56 and 57 is provided with sprockets, about which passes a sprocket chain 67. The sprocket chain extends over a sprocket wheel 68 whose center coincides with the center of the yoke shaft 59, the sprocket wheel 68 being, in turn, actuated by the sprocket chain 69, which extends over the sprocket wheel 37 and motor shaft 37'.

Although sprocket chains and sprocket wheels are provided for transmitting power from the motor 31 to the cutter bars 56 or 57, it is obvious that a gear train may be substituted therefor.

In operation, the semi-plastic popcorn is placed on the table 10, as already described. The machine table 12, with the machine cutter 11 thereon, is latched to one side of the popcorn table 10, and the switch is actuated to operate the motor in an advancing direction, the lever 61 having first been shifted to bring the proper cutter bar 56 or 57 into operative position with the other cutter bar out of operative position.

Operation of the motor causes the whole machine 11 to advance over the trackway 36, while the cutter discs 64 and 65, as shown in Figure 2, pass through the grooves 24 and 20' extending through borders 22, cutting the popcorn into long narrow discs, at the same time providing the breaking grooves 30 therein.

When the cutter machine 11 reaches the other end of the table, it is stopped, the gear track blank portion 49 serving to prevent the machine cutter accidentally travelling too far. The motor is then reversed to return the cutter to its position on the cutter table 12. The latches 53 and 54 are then disengaged and the table 12 is brought around to the adjacent side of the popcorn table 10, with the other set of cutters, as the disc 66 and cutter bar 57 are now in forward position. The motor is then operated to advance the cutter over the table 10, it being noted that the advancing position of the motor for one cutter bar is the reversing position for the other cutter bar.

The cutter machine, as it advances over the table, with discs 66 extending into grooves 20, through borders 21, makes the final cuts, separating the previously cut long strips of popcorn into the popcorn blocks 23.

Of course, water, or other cooling medium, may be continuously circulated through pipes 28 and 29, cooling the blocks so that they may be easily separated and removed from the table surface as soon as the cutting operation is completed.

For safety purposes, housing 70 and 71 may be provided at both ends of the cutter machine 11, enclosing the gear trains and sprocket chains.

The novel features and the operations of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. A popcorn cutter comprising a square popcorn table, raised borders extending about the four edges of said popcorn table, a plurality of grooves extending through said four borders, some of said grooves extending into the popcorn table surface, and a popcorn cutter machine, said cutter machine including a plurality of cutter discs, some of said cutter discs extending into said grooves as the cutter machine travels over the table to cut popcorn laid on the table surface between said raised borders, parallel trackways extending along the edges of said popcorn table, and means on said cutter machine for causing said cutter machine to travel along said parallel trackways, a popcorn cutter machine table, said machine table including parallel trackways adapted to be placed into cooperative relation with either selected pair of parallel trackways of the popcorn table, and means for latching both tables together with said trackways in cooperative relation whereby said cutter may travel from one table over to the other and back again.

2. A popcorn cutter comprising a square popcorn table, raised borders extending about the four edges of said popcorn table, a plurality of grooves extending through said borders, some of said grooves extending into the popcorn table surface, and a popcorn cutter machine, said cutter machine including a plurality of cutter discs adapted to extend through said grooves as the cutter travels over the table to cut popcorn laid on the table surface, trackways extending along the edges of said popcorn table outside of said borders thereby providing two pairs of parallel trackways on said square table; one pair being at right angles to the other pair, means on said cutter machine for causing said cutter machine to travel along a pair of said trackways, a popcorn cutter machine table, said machine table including one pair of parallel trackways adapted to be placed into cooperative relation with either selected pair of trackways of the popcorn table, means for latching both tables together with said trackways in cooperative relation whereby said cutter may travel from one table over to the other and back again, and means movably supporting said machine cutter table, whereby the trackways on the machine cutter table may be selectively placed into cooperative relation with either of the pairs of parallel trackways on the popcorn table.

3. A popcorn cutter, comprising a square popcorn cutter table, four raised borders extending adjacent the four edges of said table, a trackway between each said border and its adjacent table edge, a table surface between said raised borders, a plurality of grooves extending through said raised borders at right angles thereto, some of said grooves continuing across said table surface dividing said table surface into rectangles, and a popcorn cutter machine, means on said popcorn cutter machine for actuating said cutter machine along said either selected pair of parallel trackways over said table, and popcorn cutter discs selectively extendable into said table surface grooves to cut popcorn blocks as the popcorn cutter machine is operated over said popcorn table.

4. A popcorn cutter comprising a square popcorn cutter table, raised borders extending adjacent the four edges of said table, a trackway between each border and its table edge thereby providing two pairs of parallel trackways, a table surface between said raised borders, a plurality of grooves extending through said raised borders at right angles thereto, some of said grooves continuing across said table surface dividing said table surface into rectangles, and a popcorn cutter machine, means on said popcorn cutter machine for actuating said cutter machine along said trackways over said table, and popcorn cutter discs selectively extendable into said table surface grooves to cut popcorn blocks as the popcorn cutter is operated over said popcorn table, a popcorn cutter machine table, trackways on two sides of said popcorn cutter machine table, and means for holding the trackways on the popcorn cutter machine table in cooperative relation with a selected pair of the parallel trackways on the popcorn cutting table, whereby the popcorn cutter machine may travel over the popcorn table to make cuts along one series of parallel grooves, and then may be reversed to travel along the other selected pair of the trackways to make cuts in the popcorn on the table at right angles to the first set of cuts.

5. A popcorn cutter comprising a square table, raised borders extending about the edges of said popcorn table, a plurality of grooves extending through said borders parallel to the edges of the table, some of said grooves extending into the popcorn table surface and others of said grooves extending across only one pair of raised borders, the grooves parallel to one pair of table edges being differently spaced than the grooves parallel to the other pair of table edges and a popcorn cutter machine, said cutter machine including a plurality of cutter discs on a pair of cutter shafts selectively extending into one set of said grooves as the cutter travels over the table to cut popcorn laid on the table surface the cutter discs on one shaft being spaced to correspond to one set of table grooves and the cutter discs on the other shaft being set to correspond with the other set of table grooves.

6. A popcorn cutter comprising a square popcorn table, raised borders extending about the edges of said popcorn table, a plurality of grooves extending through said borders, said grooves being at right angles to said borders, some of said grooves extending into the popcorn table surface and said borders, others of said grooves extending across only one pair of borders, the grooves parallel to one pair of table edges being differently spaced than the grooves parallel to the other pair of table edges and a popcorn cutter machine, said cutter machine including a pair of selectively extendable cutter shafts, a plurality of cutter discs on each shaft selectively extending into one set of said grooves as the cutter travels over the table to cut popcorn laid on the table surface the cutter discs on one shaft being spaced to correspond to one set of table grooves and the cutter discs on the other shaft being set to correspond with the other set of table grooves, parallel pairs of trackways outside said borders extending along the opposite edges of said popcorn table, and means on said cutter machine for causing said cutter machine to travel along a pair of said trackways.

7. A popcorn cutter comprising a square popcorn table, raised borders extending about the edges of said popcorn table, a plurality of grooves extending through said borders, said grooves being at right angles to said borders, some of said grooves extending into the popcorn table surface and said borders, others of said grooves extending across only one pair of borders, the grooves parallel to one pair of table edges being differently spaced than the grooves parallel to the other pair of table edges and a popcorn cutter machine, said cutter machine including a pair of selectively extendable cutter shafts, a plurality of cutter discs on each shaft selectively extending into one set of said grooves as the cutter travels over the table to cut popcorn laid on the table surface the cutter discs on one shaft being spaced to correspond to one set of table grooves and the cutter discs on the other shaft being set to correspond with the other set of table grooves, parallel pairs of trackways outside said borders extending along the opposite edges of said popcorn table, and means on said cutter machine for causing said cutter machine to travel along one pair of said trackways, a popcorn cutter machine table, said machine table including one pair of parallel trackways adapted to be selectively placed into cooperative relation with either pair of parallel trackways of the popcorn table, legs on each table supporting both tables at the same height, means for latching both tables together with said trackways in cooperative relation including pins on the legs of one table and cooperating apertures in the legs of the other table whereby said cutter may travel from one table over to the other and back again.

8. A popcorn cutter comprising a square popcorn table, raised borders extending about the edges of said popcorn table, a plurality of grooves extending through said borders, said grooves being at right angles to said borders, some of said grooves extending into the popcorn table surface and said borders, others of said grooves extending across only one pair of borders, the grooves parallel to one pair of table edges being differently spaced than the grooves parallel to the other pair of table edges and a popcorn cutter machine, said cutter machine including a pair of selectively extendable cutter shafts, a plurality of cutter discs on each shaft selectively extending into one set of said grooves as the cutter travels over the table to cut popcorn laid on the table surface the cutter discs on one shaft being spaced to correspond to one set of table grooves and the cutter discs on the other shaft being set to correspond with the other set of table grooves, parallel pairs of trackways outside said borders extending along the opposite edges of said popcorn table, and means on said cutter machine for causing said cutter machine to travel along one pair of said trackways, a popcorn cutter machine table, said machine table including one pair of parallel trackways adapted to be selectively placed into cooperative relation with either pair of parallel trackways of the popcorn table, legs on each table supporting both tables at the same height, means for latching both tables together with said trackways in cooperative relation including pins on the legs of one table and cooperating apertures in the legs of the other table whereby said cutter may travel from one table over to the other and back again, and roller casters movably supporting the legs of said machine cutter table, whereby the tracks on the machine cutter table may be selectively placed into cooperative relation with either of the pairs of trackways on the popcorn table.

PETER FRANKE.